United States Patent
Lebrat et al.

(10) Patent No.: US 12,510,657 B2
(45) Date of Patent: Dec. 30, 2025

(54) METHOD FOR LOCATING AN AIRCRAFT IN FLIGHT

(71) Applicant: THALES, Courbevoie (FR)

(72) Inventors: Jean-Philippe Lebrat, Valence (FR); Rodolphe Cottron, Merignac (FR); Dominique Bouard, Valence (FR)

(73) Assignee: THALES, Courbevoie (FR)

( * ) Notice: Subject to any disclaimer, the term of this patent is extended or adjusted under 35 U.S.C. 154(b) by 354 days.

(21) Appl. No.: 18/245,236

(22) PCT Filed: Sep. 22, 2021

(86) PCT No.: PCT/EP2021/076030
§ 371 (c)(1),
(2) Date: Mar. 14, 2023

(87) PCT Pub. No.: WO2022/063810
PCT Pub. Date: Mar. 31, 2022

(65) Prior Publication Data
US 2023/0358883 A1 Nov. 9, 2023

(30) Foreign Application Priority Data
Sep. 24, 2020 (FR) .................................. 2009720

(51) Int. Cl.
*G01S 13/91* (2006.01)
*G01S 7/41* (2006.01)
(Continued)

(52) U.S. Cl.
CPC ............ *G01S 13/913* (2013.01); *G01S 7/412* (2013.01); *G01S 13/86* (2013.01); *G01S 13/75* (2013.01)

(58) Field of Classification Search
CPC ........ G01S 13/913; G01S 7/412; G01S 13/86; G01S 13/75
See application file for complete search history.

(56) References Cited

U.S. PATENT DOCUMENTS 3,775,766 A * 11/1973 Gendreu ............... G01S 13/913
342/149
8,698,669 B1 * 4/2014 Woodell .................. G01S 13/46
701/4
(Continued)

FOREIGN PATENT DOCUMENTS

| CN | 107064985 A | 8/2017 |
|----|-------------|--------|
| EP | 0898717 | 3/1999 |

(Continued)

OTHER PUBLICATIONS

FR 2009720, INPI Rapport de Recherche Preliminaire, May 20, 2021, 2 pages.

(Continued)

*Primary Examiner* — Vladimir Magloire
*Assistant Examiner* — Nazra Nur Waheed
(74) *Attorney, Agent, or Firm* — Soquel Group LLC

(57) ABSTRACT

A method of locating an aircraft in flight by means of a locating device including at least one sensor and a radar, the method including a first phase of determining a position of the aircraft, referred to as the first position, by means of the at least one sensor according to a signal supplied by the at least one sensor, a second phase of determining, at the same time as the first determination phase, a position of the aircraft, referred to as the second position, by means of the radar, and a phase of comparing data associated with the first position and data associated with the second position after which the first position is either validated or invalidated.

12 Claims, 5 Drawing Sheets

(51) Int. Cl.
G01S 13/86 (2006.01)
G01S 13/75 (2006.01)

(56) References Cited

U.S. PATENT DOCUMENTS

| | | | |
|---|---|---|---|
| 10,705,201 B1* | 7/2020 | Jinkins | G01S 13/282 |
| 2007/0171094 A1* | 7/2007 | Alter | G01C 23/00 |
| | | | 340/970 |
| 2016/0026189 A1* | 1/2016 | Boada-Bauxell | G06T 7/73 |
| | | | 348/144 |
| 2020/0312170 A1* | 10/2020 | Sherback | G08G 5/54 |

FOREIGN PATENT DOCUMENTS

| | | |
|---|---|---|
| EP | 1287411 | 3/2003 |
| EP | 1860456 B1 | 11/2007 |
| EP | 3179275 A1 | 6/2017 |
| WO | 9743665 A1 | 11/1997 |
| WO | 0195042 A1 | 12/2001 |

OTHER PUBLICATIONS

International Search Report, PCT/EP2021/076030, Dec. 21, 2021, 2 pages.

* cited by examiner

METHOD FOR LOCATING AN AIRCRAFT IN FLIGHT

REFERENCE TO RELATED APPLICATIONS

This application claims benefit under 35 USC § 371 of PCT Application No. PCT/EP2021/076030 entitled METHOD FOR LOCATING AN AIRCRAFT IN FLIGHT, filed on Sep. 22, 2021 by inventors Jean-Philippe Lebrat, Rodolphe Cottron and Dominique Bouard. PCT Application No. PCT/EP2021/076030 claims priority of French Patent Application No. 20 09720, filed on Sep. 24, 2020.

TECHNICAL FIELD OF THE INVENTION

The present invention relates to a method for locating an aircraft in-flight. The present invention further relates to the associated locating device. The present invention further relates to an aircraft comprising such a locating device.

BACKGROUND OF THE INVENTION

Aircraft are conventionally equipped with on-board equipment for assisting in piloting the aircraft. In particular, when visibility conditions are reduced (fog, snow, heavy rain), the crew or the pilot of the aircraft refers to such equipment e.g. for the approach and the landing phases.

In order to allow the correct operation of such equipment, the aircraft comprises devices for locating the aircraft generally based on inertial sensors and/or radionavigation sensors.

Nevertheless, such locating devices have operating limitations. In particular, the locations obtained by the inertial sensors are not sufficiently accurate. Radionavigation sensors are very dependent on the environment, and hence likely to be scrambled or affected by a breakdown.

There is hence a need for a method for consolidating the conventional locating solutions of an aircraft.

SUMMARY OF THE INVENTION

To this end, the subject matter of the present description is a method for locating an aircraft in flight, the aircraft flying over a zone of space comprising on the ground, characteristic elements arranged in at least one row, the locating method being implemented by a locating device borne by the aircraft, the locating device comprising a first locating unit and a second locating unit, the first locating unit comprising at least one sensor selected from an inertial sensor and a radionavigation sensor, the second locating unit comprising a radar, the method comprising:
  a first phase of determining a position of the aircraft, called first position, by the first locating unit according to a signal supplied by the or at least one sensor,
  simultaneously with the first determination phase, a second phase of determining a position of the aircraft, called second position, by the second locating unit, the second determination phase comprising:
    the detection by radar, of the characteristic elements of the zone overflown, each detection being associated with coordinates,
    the determination, according to the coordinates of the detected elements, of:
      the distance from the orthogonal projection on the straight line passing through the or at least one of the rows of elements of the horizontal projection of the radar, called first distance, the horizontal projection of the radar being the orthogonal projection of the position of the radar on the ground,
      the distance from the orthogonal projection on a straight line, perpendicular to the or at least one of the rows of elements, of the horizontal projection of the radar, called second distance,
    determining the second position according to the determined first and second distances.
  a phase of comparing data associated with the first position and data associated with the second position after which the first position is either validated or invalidated.

According to other advantageous aspects of the invention, the method comprises one or a plurality of the following features, taken individually or according to all technically possible combinations:
  the overflown zone is a landing site of the aircraft and the characteristic elements are characteristic elements of the landing place, such as beacons;
  the landing site comprises a runway with a longitudinal axis equidistant from the longitudinal edges of the runway, called runway centerline, the characteristic elements being distributed over the runway in at least two longitudinal rows and at least one transverse row, the longitudinal rows being substantially parallel to the runway centerline, two of the longitudinal rows each being arranged along a distinct longitudinal edge of the runway, the or each transverse row being substantially perpendicular to the runway centerline, the last transverse row in the direction of landing of the aircraft on the runway being called runway threshold, the first distance being the distance from the orthogonal projection on the runway centerline of the horizontal projection of the radar, called axial offset, the second distance being the distance from the orthogonal projection on the line passing through the runway threshold of the horizontal projection of the radar, called distance to the runway threshold;
  the comparison phase includes the triggering of an alert when the first position is invalidated, the method comprising a phase of modifying the trajectory of the aircraft;
  the first position is associated with a first standard deviation and the second position is associated with a second standard deviation, the uncertainty on the first position showing as a first ellipsoid, the center of which is the first position and the radius of which depends on the first standard deviation, the uncertainty on the second position showing as a second ellipsoid, the center of which is the second position and the radius depends on the second standard deviation, the first position being invalidated during the comparison phase when the second ellipsoid and the first ellipsoid are disjoint;
  when the first position has been validated, the method comprises a phase of merging the first and second positions so as to obtain an optimized position of the aircraft;
  the comparison phase comprises the display, on a display of the locating device, of an image of the zone overflown which was determined, according to the first position, from a set of images in a database, the displayed image comprising the characteristic elements of the zone overflown by the aircraft, the comparison phase further comprising the superposition over the displayed image of a representation of the characteristic elements of the zone overflown which were detected by the radar during the determination of the second position, the first position being validated when the characteristic elements superimposed over the image have substantially the same position on the displayed image as the corresponding characteristic elements already present on the displayed image, and being invalidated otherwise;

the phase of determining the second position comprises the determination of the angular offset between the radar axis and a line parallel or perpendicular to the or at least one of the rows of elements, referred to as reference line, the first distance and the second distance being determined according to the determined angular offset;

during the phase of determining the second position, the determination of the angular offset comprises:
  the conversion of the coordinates of each detection into Cartesian coordinates,
  for each angular offset value within a range of predetermined values, the determination, for each detection, of a Cartesian coordinate along the abscissa axis corrected by the value of said angular offset,
  for each angular offset value within the range of predetermined values, the determination of the number of detections corresponding to each Cartesian coordinate corrected along the x-axis, the angular offset value associated with the greatest number of detections being the angular offset between the radar axis and the reference line.

the reference line is the runway centerline, during the phase of determining the second position, the determination of distances comprising:
  the calculation of the Cartesian coordinates of each detection, corrected for the angular offset determined in the determination step, referred to as the optimal Cartesian coordinates,
  the determination of a histogram of the positions along the x-axis of each detection as a function of the optimal Cartesian coordinates of each detection, the histogram having at least two peaks, and
  the determination of the axial offset as a function of the Cartesian coordinates along the abscissa axis of at least the two peaks of the histogram.

the reference line is the runway centerline, during the phase of determining the second position, the determination of distances comprising:
  the calculation of the Cartesian coordinates of each detection, corrected for the angular offset determined in the determination step, called optimal Cartesian coordinates,
  the determination of a histogram of the y-axis positions of each detection according to the optimal Cartesian coordinates of each detection, the histogram having at least one peak, and the determination of the distance to the runway threshold according to the Cartesian coordinates along the y-axis of the peak(s) of the histogram.

The present description further relates to a device for locating an aircraft in-flight, the aircraft flying over a zone of space comprising on the ground, characteristic elements arranged in at least one row, the electronic locating device being borne by the aircraft, the locating device comprising a first locating unit and a second locating unit, the first locating unit comprising at least one sensor selected from an inertial sensor and a radionavigation sensor, the second locating unit comprising a radar, the location device being configured for implementing a method as described hereinabove.

The present description further relates to an aircraft comprising an locating device such as described hereinabove.

BRIEF DESCRIPTION OF THE DRAWINGS

Other features and advantages of the invention will appear upon reading the following description which follows embodiments of the invention, given only as a limiting example, and making reference to the following drawings.

DETAILED DESCRIPTION

Figure 1:
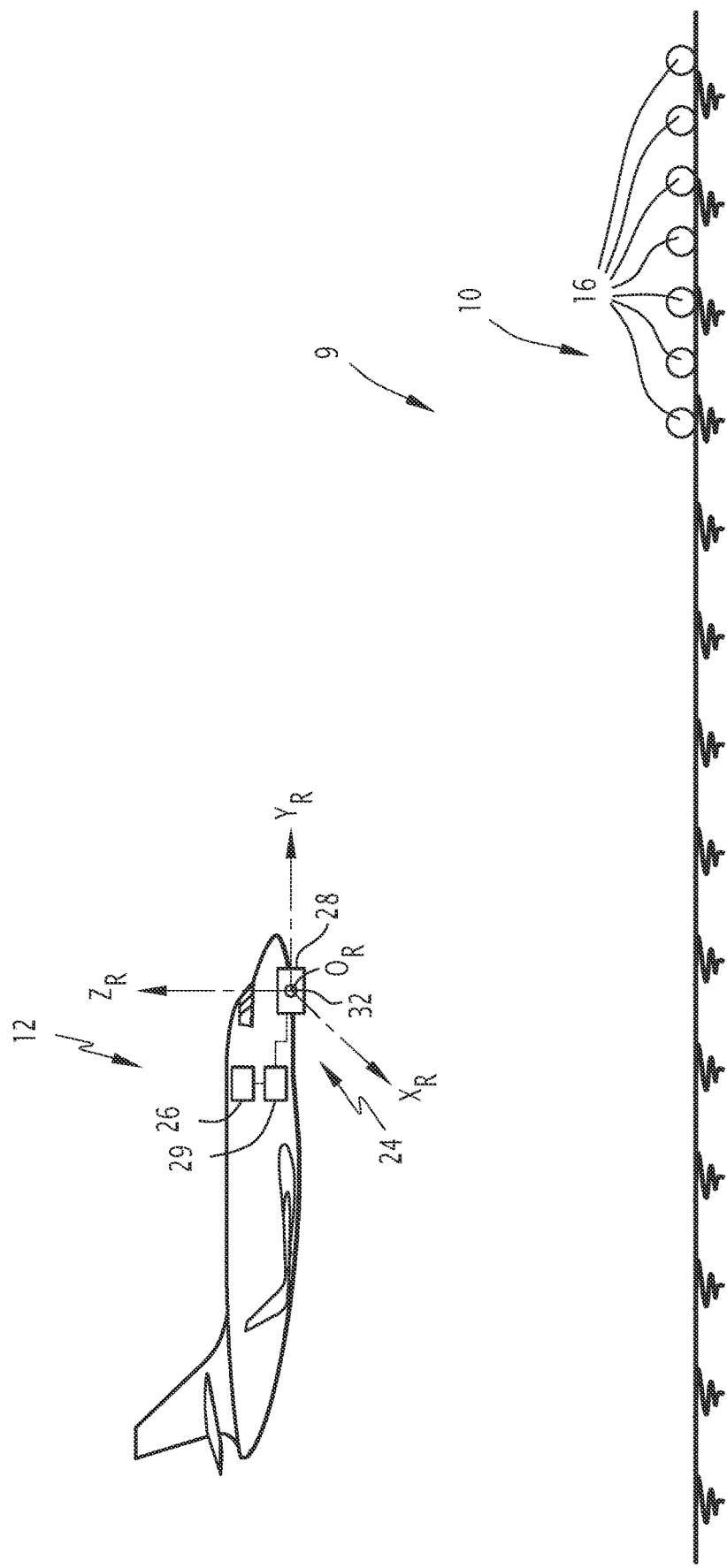
FIG. 1, a schematic representation of an aircraft in-flight, the zone overflown by the aircraft being a landing site of the aircraft comprising a runway, FIG. 2, a schematic plan view of an example of a runway and of the horizontal projection of an aircraft radar in the horizontal plane of the runway.

A zone of space 9 and an aircraft 12 in-flight above the zone of space 9 are illustrated in FIG. 1.

In this particular example, the zone of space 9 is a landing site, more precisely a runway 10, and the aircraft 12 is an airplane. In this example, the aircraft 12 is approaching the runway 10 for landing on the runway 10.

Figure 2:
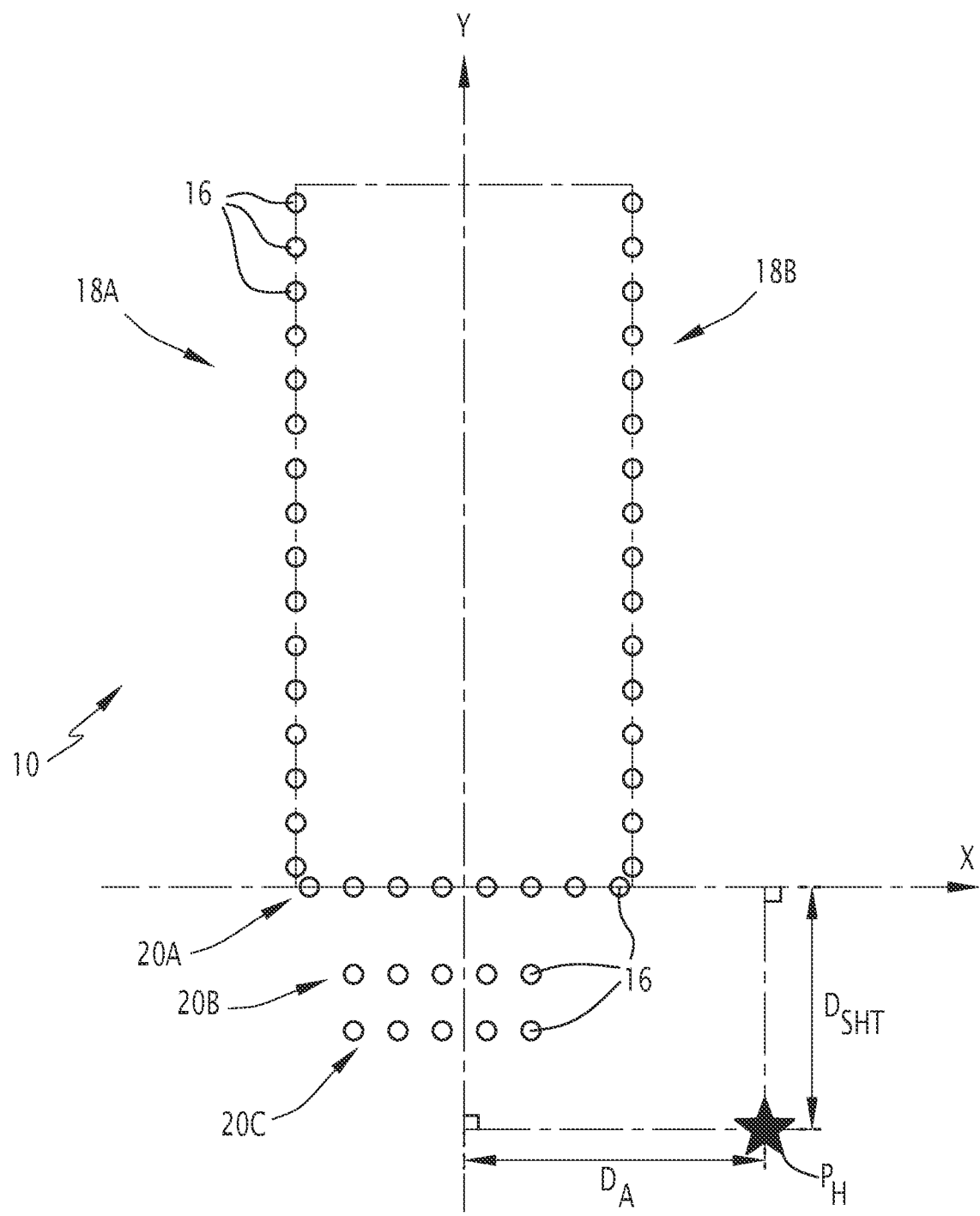

As shown in FIG. 2, the runway 10 is a rectangular surface for the landing and the take-off of aircraft. The runway 10 comprises longitudinal edges (two) and transverse ends (two) delimiting the runway 10.

The length of the runway 10 is e.g. between 3 kilometers (km) and 4 km. The width of the runway 10 is comprised e.g. between 25 m and 45 m.

In the example illustrated in FIG. 2, the runway 10 has a longitudinal axis along the longitudinal direction of the runway 10 and at an equal distance from the longitudinal edges of the runway 10. The longitudinal axis is called runway centerline Y. An axis perpendicular to the runway centerline Y is also represented in FIG. 2 by the reference "X".

The runway 10 comprises a set of characteristic elements 16. For clarity, only certain characteristic elements 16 are numbered in FIG. 2. The characteristic elements 16 are e.g. lamps, also called light beacons. In a variant, the characteristic elements 16 are radar reflectors (such as trihedron or Luneberg lenses). In a further variant, the characteristic elements 16 are other elements found on a runway.

In the present example, the characteristic elements 16 are distributed over the runway 10 in at least two longitudinal rows 18A, 18B and at least one transverse row 20.

The longitudinal rows 18A, 18B are substantially parallel to the runway centerline Y. Two of the longitudinal rows 18A, 18B are each arranged along a distinct longitudinal edge of the runway 10. The term "arranged along" means that the rows are arranged less than three meters from the corresponding longitudinal edge.

The or each transverse row 20 is substantially perpendicular to the runway centerline Y. In the example illustrated in FIG. 2, the runway 10 comprises three transverse rows 20A, 20B, 20C of characteristic elements 16. The last transverse row 20A along the direction of aircraft landing on runway 10 is called the runway threshold (the row 20A in the example shown in FIG. 2).

In a variant, the runway 10 comprises at least three longitudinal rows: the two longitudinal rows 18A, 18B and a third longitudinal row 18C (not shown) arranged along the runway centerline Y and downstream of the runway threshold.

A person skilled in the art would understand that such example is given as an illustration. The zone of space 9 is more generally an overflown zone comprising on the ground, on a relief or on a known surface, predetermined characteristic elements 16 (reflectors) arranged in at least one row. The zone of space 9 is thus e.g. a landing site which does not comprise a runway or a control zone which does not allow the aircraft 12 to land. Furthermore, the aircraft 12, in a variant, is a helicopter or a drone.

The aircraft 12 further comprises an electronic locating device 24. The locating device 24 is borne by the aircraft 12.

An example of locating device 24 is illustrated by the FIG. 1. In the present example, the locating device 24 comprises a first locating unit 26, a second locating unit 28 and a calculator 29.

The first locating unit 26 implements a so-called conventional location solution chosen from an inertial locating solution, a radionavigation locating solution and a solution resulting from the combination of inertial and radionavigation solutions.

The first locating unit 26 comprises at least one sensor chosen from among an inertial sensor and a radionavigation sensor. The inertial sensor is e.g. an accelerometer, a gyrometer or a gyroscope. The radionavigation sensor is e.g. a GPS (acronym for "Global Positioning System").

More precisely, in the case of a radionavigation solution, the first locating unit 26 comprises e.g. a VOR system (abbreviation for "VHF Omnidirectional Range"), a DME system (abbreviation for Distance Measuring Equipment), a GPS, an SBAS, a GBAS or an ILS. Such systems e.g. meet the requirements of various types of approaches for landing (NPA, LNAV, VNAV, LPV, ILS, etc.).

The second locating unit 28 implements a locating solution by means of a radar.

The second locating unit 28 comprises at least one radar 32 in communication with a calculator, such as the calculator 29 of the locating device 24. In a variant, the second locating unit 28 comprises a specific calculator thereof for directly processing the measurements made by the radar 32.

The radar 32 defines a reference system represented in FIG. 1 by a Cartesian reference system with the center in $O_R$, of abscissa $X_R$, of ordinate $Y_R$ and of altitude $Z_R$. The ordinate $Y_R$ is the longitudinal axis of the detection and is called the radar axis. When the radar 32 is correctly positioned on the aircraft 12, the radar axis $Y_R$ substantially coincides with the trajectory of the aircraft 12.

The radar 32 is advantageously a millimeter-wave radar. Preferentially, the distance resolution of the radar is on the order of a few meters, and the angular resolution of the radar is fine, i.e. on the order of a few tenths of a degree.

The radar 32 preferentially comprises at least three reception channels for measuring, for each detection, the radial distance of the detection, the circular angle of the detection in the radar 32 coordinate frame, and the negative elevation angle of the detection in the radar 32 coordinate frame. The radial distance from any point M is the distance thereof from the origin $O_R$ of the coordinate frame. The circular angle, or the circular, is the angle of the projection on the plane $(O_R X_R Y_R)$ of the angle carried by the axis $(O_R Y_R)$ and the straight line $(O_R C)$ passing through the target point C. The negative elevation angle is the angle formed between the plane $(O_R X_R Y_R)$ of the radar 32 and the straight line from the radar 32 to the target point C.

The calculator 29 is e. g. a computer.

Figure 3:
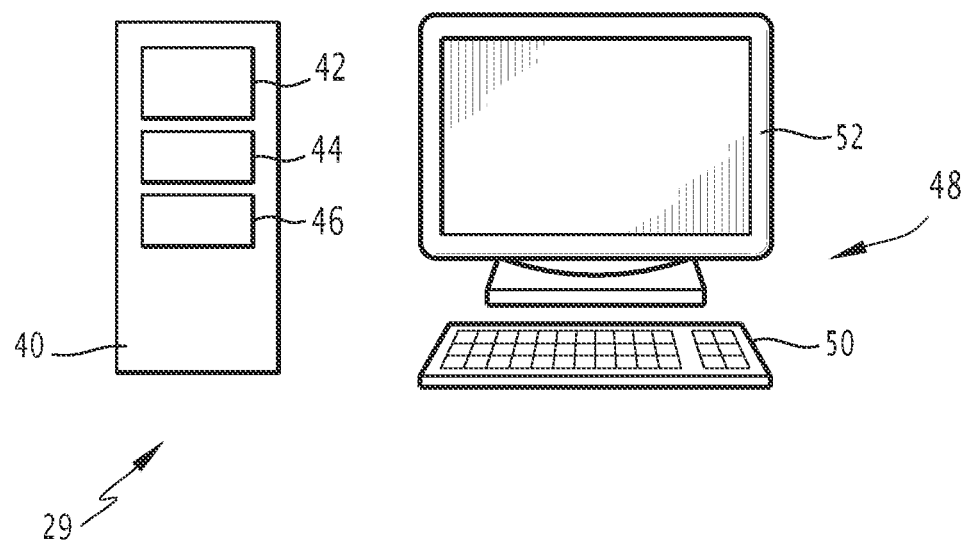
FIG. 3 is a schematic representation of an example of calculator of the electronic device, FIG. 4, a flow chart of an example of a locating device, and FIG. 5, a flow chart of an example of the second phase of determining a position of the locating method shown in FIG. 4.

In the example illustrated in FIG. 3, the calculator 29 comprises a processor 40 comprising a data processing unit 42, memories 44, a data storage reader 46 and, optionally, a human-machine interface 48 comprising a keyboard 50 and a display 52.

The calculator 42 interacts with the computer program product. The computer program product includes a data storage medium. The data storage medium is medium readable by the processing unit 42. The readable data storage medium is a medium suitable for storing electronic instructions and apt to be coupled to a bus of a computer system.

As an example, the data storage medium is a USB key, a diskette or a floppy disk, an optical disk, a CD-ROM, a magneto-optical disk, a ROM, a RAM, an EPROM, an EEPROM, a magnetic card or an optical card.

The computer program containing program instructions is stored on the storage medium.

The computer program can be loaded into the data processing unit 42 and is suitable for leading to the implementation of a locating method which will be described hereinafter in the description.

In another embodiment (not shown), the calculator 29 is produced in the form of one or a plurality of programmable logic components, such as an FPGA (Field Programmable Gate Array), or further in the form of one or a plurality of dedicated integrated circuits, such as ASIC (Application Specific Integrated Circuit). The calculator 29 is in such case configured for implementing a locating method as will be described hereinafter in the description.

Figure 4:
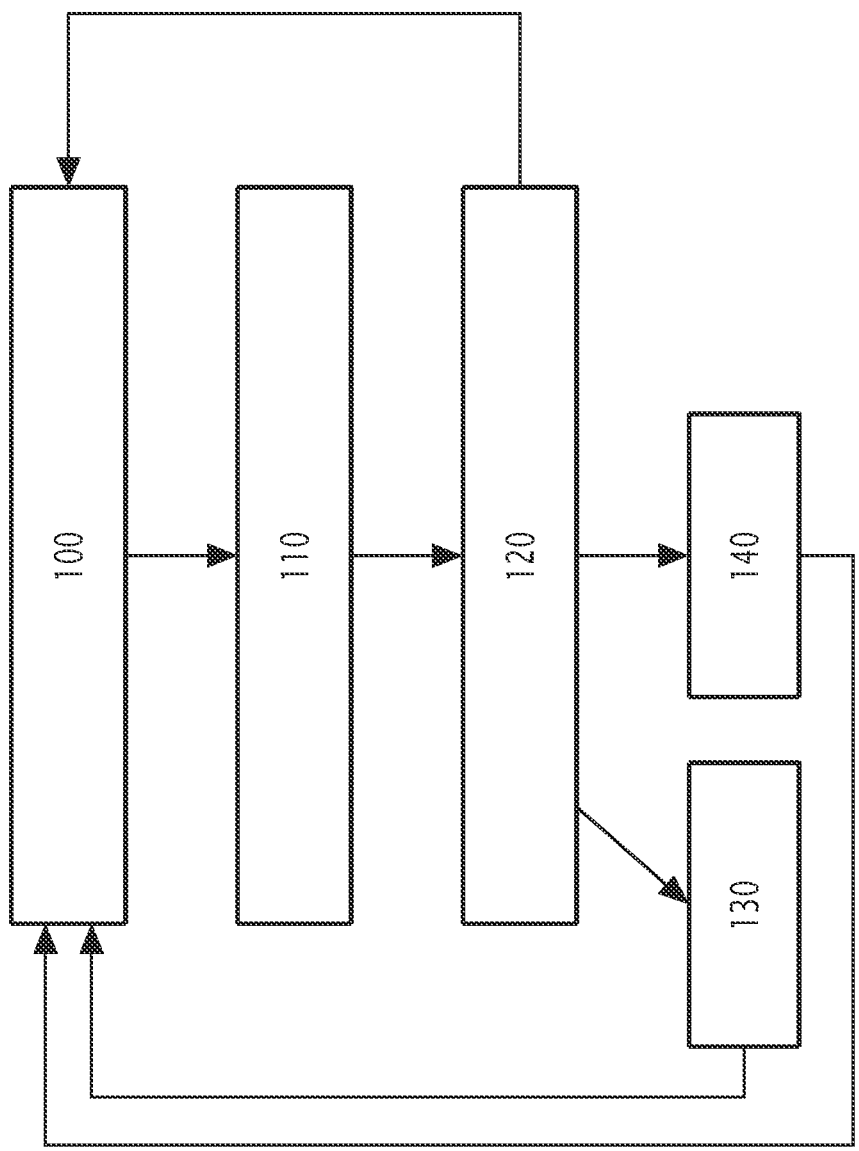

The operation of the locating device 24 will now be described with reference to FIG. 4 which schematically illustrates an example of implementation of a locating method.

The locating method is intended for being implemented during a flight over a zone comprising, on the ground, the characteristic elements 16. In particular, the locating method is particularly suitable for the phases where the aircraft 12 approaches a landing site for landing the aircraft 12.

Advantageously, the locating method is implemented in real time, i.e. at every instant.

The locating method comprises a first phase 100 of determining a position of the aircraft 12, called first position, by the first locating unit 26 according to a signal supplied by the or at least one sensor of the first unit 26.

The first position is thereby obtained by a conventional inertial and/or radionavigation method. The first position provides first coordinates.

Advantageously, at the end of the first determination phase 100, the speed of the aircraft 12 is also obtained.

The locating method comprises a second phase 110 of determining a position of the aircraft 12, called second position, by the second locating unit 28.

Figure 5:
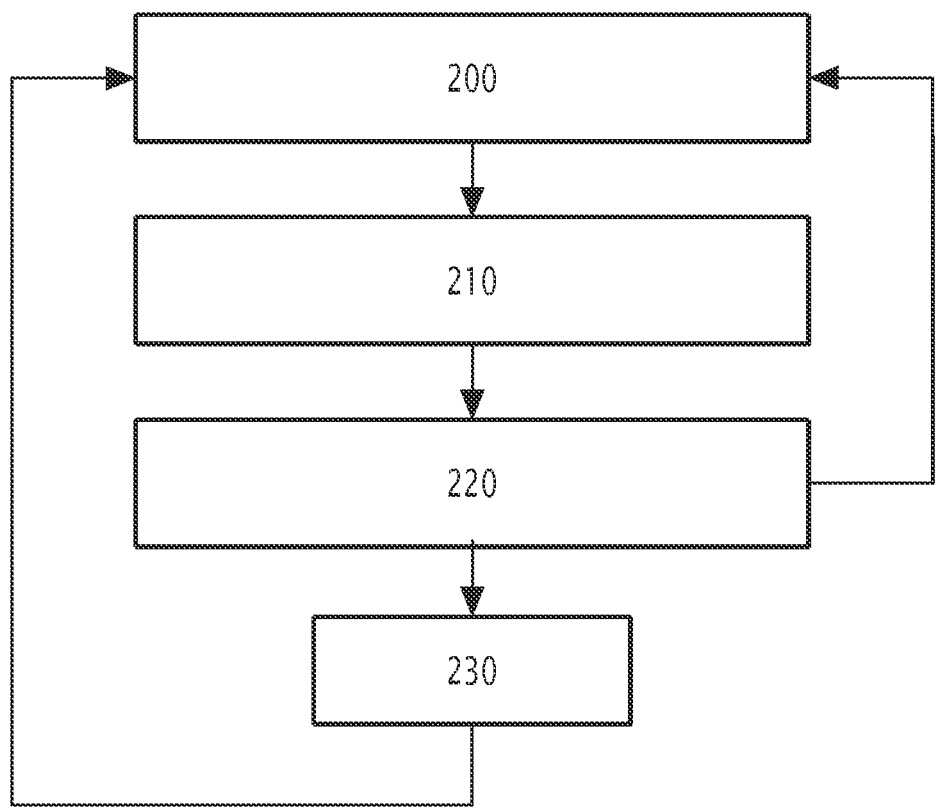

The second determination phase 110 is implemented simultaneously with the first determination phase 100, the aim being to evaluate the position of the aircraft 12 at the same moment. An example of implementation of the second determination phase 110 is illustrated by the FIG. 5.

The second determination phase 110 comprises a step 200 of detection, by the radar 32, of characteristic elements 16 of the zone overflown, in particular of the runway 10 in the example shown in FIGS. 1 and 2.

Each detection is associated with coordinates. In particular, each detection is defined by a radial distance, a circular angle in the coordinate frame of the radar 32 and an negative elevation angle in the coordinate frame of the radar 32. At the end of the detection step, a radar image is thereby obtained on which the detections are represented.

Equivalently, after changing the coordinate frame, each detection can be defined by a radial distance D, an elevation angle S, defined with respect to the local horizontal to the aircraft 12 and a bearing angle G, defined with respect to the longitudinal axis of the aircraft 12.

For changing e.g. from the coordinates (altitude, circular) =(E,C) to (elevation, bearing)=(S,G), one starts by calculating the Cartesian direction vector ux=cos E·cos C, uy=cos E·sin C and uz=sin E. The rotation matrix corresponding to the opposite of the radar altitude setting angle, then the rotation matrix corresponding to the opposite of the roll of the aircraft, then the rotation matrix corresponding to the opposite of the pitch of the aircraft, are then applied to said vector. The vector obtained is expressed in Cartesian coordinates in the local horizontal coordinate frame of the aircraft and the altitude and the bearing values are obtained by performing the transformation from Cartesian to polar coordinates. Such an operation involves knowing the altitude setting angle of the radar (related to the mechanical installation of the radar on the aircraft), the roll angle and the pitch angle of the aircraft, generally provided by the aircraft inertial unit.

Advantageously, the radar 32 applies a processing such as the constant false alarm rate (CFAR) to the radar image obtained, which leads to a better detection of the characteristic elements 16. Thus, temporally, a "radar image" begins to form from the signals backscattered by the ground and received by the radar. A CFAR processing is applied to said image, which makes it possible to provide a list of detections with the coordinates thereof.

The second determination phase 110 comprises a step 210 of determining, as a function of the coordinates of the characteristic elements 16 detected, the angular offset T between the radar axis $Y_R$ and a straight line either parallel or perpendicular to the or at least one of the rows of elements, referred to as the reference line. The reference line is a predetermined line according to the zone overflown and to the geometry of the characteristic elements 16 on the overflown zone. In the example illustrated in FIGS. 1 and 2, the reference line is the runway centerline Y. The determination step 210 is implemented by the calculator 29.

The step of determining the angular offset T comprises e.g.:
- the conversion of the coordinates of each detection into Cartesian coordinates,
- for each value of angular offset $T_{test}$ comprised within a range of predetermined values, the determination, for each detection, of a Cartesian coordinate along the abscissa axis, corrected for the value of said angular offset $T_{test}$,
- for each angular offset value $T_{test}$ within the range of predetermined values, the determination of the number of detections corresponding to each Cartesian coordinate corrected along the abscissa axis, the angular offset value $T_{test}$ associated with the greatest number of detections being the angular offset T between the radar axis $Y_R$ and the reference line.

A more specific example of determining the angular offset T is given when the reference line is the axis Y of the runway 10 (FIGS. 1 and 2). The present example uses the fact that the characteristic elements 16 are aligned in rows parallel with the runway centerline Y.

In said example, the step of determining the angular offset T comprises the conversion of the coordinates of the detected elements into Cartesian coordinates. The Cartesian coordinates are given by the following formulas:

$$x = D \cdot \cos S \cdot \sin G \quad (1)$$

$$y = D \cdot \cos S \cdot \cos G \quad (2)$$

Where:
x is a Cartesian coordinate along the abscissa axis,
y is a Cartesian coordinate along the ordinate axis,
D is the radial distance,
S is the elevation angle, and
G is the bearing angle.

The determination step 210 then comprises, for test values of angular offset $T_{test}$, the determination, for each detection, of a Cartesian coordinate along the abscissa axis, corrected for the value of said angular offset $T_{test}$. The angular offset test values $T_{test}$ are the values within a predetermined interval of values with a predetermined step. The interval of values is comprised e.g. between −10 degrees)(° and 10° and the predetermined step is equal to one tenth of degree. Thus, for each angular offset test value $T_{test}$, the Cartesian coordinates along the x-axis of the detections are obtained by the following formula:

$$x = D \cdot \cos S \cdot \sin(G + T_{test}) \quad (3)$$

Then, for each angular offset test value $T_{test}$, the determination step 210 comprises the determination of the number of detections corresponding to each Cartesian coordinate corrected along the abscissa axis. The angular offset value $T_{test}$ associated with the greatest number of detections is the angular offset T between the radar axis $Y_R$ and the runway centerline Y. The above amounts to producing, for each angular offset test value $T_{test}$, a histogram of the positions along the x-axis and counting, for each interval along the x-axis, the number of detections the x-position of which gives the highest peak (whatever the value of x), which reflects the fact that the detections have been aligned as best as possible with respect to the runway centerline Y.

Optionally, the angular offset T is refined by finding the position of the maximum of the second order regression around the peak.

In a second example, the angular offset T is obtained by performing a principal component analysis (PCA) of the list of the detections. In such case, the covariance matrix of the pairs (x,y) is first calculated, which makes it possible to deduce therefrom, the eigenvectors and finally the angular offset T.

In a third example, the angular offset T is obtained by applying a Hough transform to the list of the detections, and the accumulation point gives the angular offset T However, the second and the third examples give less robust results than the first example, since each characteristic element does not always correspond to a detection (detection probability <1), or some detections may not be characteristic elements 16 (other objects near the runway which can lead to a detection, or false alarm).

At the end of the determination step 210, the Cartesian coordinates of detections corrected for the angular offset T, called optimal Cartesian coordinates, are given by the following formulae:

$$x = D \cdot \cos S \cdot \sin(G + T) \quad (4)$$

$$y = D \cdot \cos S \cdot \cos(G + T) \quad (5)$$

The second determination phase 110 comprises a step 220 of determining the relative position of the aircraft 12 with respect to the zone overflown as a function of the determined angular offset T and of the coordinates of the characteristic elements 16 detected. The determination step 220 is implemented by the calculator 29.

To this end, the distance from the orthogonal projection on the straight line passing through the or at least one of the rows of elements of the horizontal projection $P_H$ of the radar, called first distance D1, is determined. The horizontal projection $P_H$ of the radar is the orthogonal projection of the position of the radar on the ground.

The distance from the orthogonal projection on a straight line, perpendicular to the or at least one of the rows of elements, of the horizontal projection $P_H$ of the radar, called second distance D2, is also determined.

The second position of the aircraft 12 is then obtained according to the first distance D1 and of the second distance D2 determined.

If the zone overflown is a runway (example of FIGS. 1 and 2), the first distance D1 is the distance of the orthogonal projection on the runway centerline Y of the horizontal projection $P_H$ of the radar 32, called the axial offset DA. The horizontal projection $P_H$ of the radar 32 is the orthogonal projection of the position of the radar 32 in the horizontal plane of the runway 10. The second distance D2 is the distance from the orthogonal projection on the straight line passing through the runway threshold of the horizontal projection $P_H$ of the radar 32, called distance to the runway threshold $D_{SHT}$.

A more specific example of determining the axial offset DA and the distance to the runway threshold $D_{SHT}$ is given hereinafter.

The axial offset $D_A$ e.g. is obtained by determining a histogram of the positions along the abscissa axis of each detection according to the optimal Cartesian coordinates of each detection. The histogram obtained has as many peaks as there are longitudinal rows of characteristic elements 16 on the runway 10. Accordingly, the histogram comprises at least two lateral peaks corresponding to the two longitudinal rows 18A, 18B extending along the longitudinal edges of the runway 10. The axial offset DA corresponds e.g. to the mean of the coordinates along the x-axis of the two lateral peaks.

In a variant, when the runway 10 also has a longitudinal row of characteristic elements 16 extending along the runway centerline Y, the histogram obtained also has a central peak between the two lateral peaks. In such case, the axial offset $D_A$ is e.g. the x position of the central peak.

The distance e.g. to the runway threshold $D_{SHT}$ is obtained by determining a histogram of the positions along the y-axis of each detection according to the optimal Cartesian coordinates of each detection. The histogram obtained has as many peaks as there are transverse rows of characteristic elements 16 on the runway 10. The distance to the runway threshold $D_{SHT}$ is in such case, the coordinate along the y-axis (in y) of the furthest peak, i.e. the peak having the largest y coordinate.

Optionally, the second determination phase 110 further comprises a step 230 of determining the horizontal speed of the aircraft 12 with respect to the reference line (runway centerline Y in the case of FIGS. 1 and 2) expressed according to two components Vx, Vy depending on the variation over time of the first distance D1 and on the variation over time of the second distance D2. The Vx component is the component of the projected velocity on the x-axis. The Vy component is the component of the projected velocity on the y-axis. The determination step 140 is implemented by the calculator 29.

An example of the implementation of said step is given in the case of FIGS. 1 and 2 (the runway 10).

In particular, the variation over time of the distance to the runway threshold $D_{SHT}$ gives the component Vy of the velocity, and the variation over time of the axial offset $D_A$ gives the component Vx of the velocity. Such variations over time are e.g. calculated using a Kalman filter.

The locating method comprises a phase 120 of comparing data associated with the first position determined during the phase 100 and data associated with the second position determined during the phase 110. At the end of the phase 120 of comparison, the first position is either validated or invalidated. When the first position is e.g. invalidated, an alert is triggered. The comparison phase 120 is implemented by the calculator 29.

In a first embodiment of the comparison phase 120, the first position is compared with the second position for either validating or not validating the first position. In particular, the first position is associated with a first standard deviation and the second position is associated with a second standard deviation. The uncertainty on the first position shows as a first ellipsoid, the center of which is the first position and the radius of which is a function of the first standard deviation. The uncertainty on the second position shows as a second ellipsoid, the center of which is the second position and the radius of which is a function of the second standard deviation. The comparison phase comprises invalidating the first position when the first ellipsoid and the second ellipsoid are disjoint, in particular when the second ellipsoid is not included in the first ellipsoid. In such case, an alert is e.g. triggered.

An example of the implementation of the comparison is given hereinafter. For each of the location data (d=position denoted by p, or speed denoted by v) of the aircraft (denoted by A) coming from the 2 sources (s=primary source (inertial and/or radionavigation sensor, phase 100) denoted by the capital letter P or V, or secondary source (radar, phase 110) denote by the lowercase p or v), let us name $\sigma_{d\_s\_e}$ the standard deviation thereof along the direction of the e axis (X, Y, Z) of a Cartesian spatial coordinate frame linked to the runway (ReperePiste):

$\sigma_{d\_s\_e}$ Is the square root of the diagonal term of the line e of the covariance matrix MatCov_d_$s_{A[ReperePiste]}$ and MatCov_P$_{A[ReperePiste]}$ represents the covariance matrix of the position (P) of the aircraft (A), derived from the primary source (P in capital letters) and expressed in the coordinate frame ReperePiste.

Thus, $\sigma_{d\_s\_X}$, $\sigma_{d\_s\_Y}$ and $\sigma_{d\_s\_Z}$ represent the lateral, longitudinal and vertical standard deviations, respectively, of the location data of the aircraft to be guided.

The distance between the location data from the two sources is calculated in the ReperePiste by the Euclidean norm:

$$\Delta_{Position} = \|\overrightarrow{P_A p_A}\| \text{ and } \Delta_{Velocity} = \|\overrightarrow{V_A} - \overrightarrow{v_A}\|$$

Let us name $\Delta_{d\_e}$ the projection of the distance between the location data (d=position, velocity), coming from the two sources, on the axes (e=X, Y and Z) of the ReperePiste.

Let us name Max$_{d\_e}$ the maximum acceptable uncertainty of the location data d on the e axis. The maximum uncertainty is e.g. known.

Let us rename $P_{SensorError\ (i)}$=ProbaErr$_{d\_s}$ the acceptable probability of error of the location data d from the source s.

Let us name $k_{d\_s}$ the coefficient applied to the standard deviation of the location data d from the source s for providing a consistent protection radius of the integrity objective of said source:

$$k_{d\_s} = norminv\left(1 - \frac{ProbaErr_{d_s}}{2}\right)$$

where $k_{d\_s} \cdot \sigma_{d\_s\_e}$ represents the uncertainty of the data d from the source s and along the e axis.

An integrity alert is canceled on the location data d if the following relation is satisfied on any (at least one) of the three e axes (s1=primary source and s2=secondary source of location data d):

$$\Delta_{d\_e} + k_{d\_s1} \cdot \sigma_{d\_s1\_e} > Max_{d\_e}$$

or $$\Delta_{d\_e} + k_{d\_s2} \cdot \sigma_{d\_s2\_e} > k_{d\_s1} \cdot \sigma_{d\_s1\_e}$$

By applying said algorithm and making the hypothesis of independence of the sources s1 and s2, the resulting error probability of the location data d:

$$P_{SystemError\_d} = ProbaErr_{d\_s1} \cdot ProbaErr_{d\_s2}.$$

Such comparison phase makes it possible to contain the resulting location error within limits and with a level of integrity as per the safety objectives set for the flight phase. The above is made possible in particular by the fact that the locating solution using a radar described hereinabove is independent of conventional solutions (inertial and radionavigation).

A person skilled in the art would understand that the comparison phase 120 comprises a prior step of changing the coordinate frame of the coordinates of the first position and of the second position obtained, in order to place same in the same geometric coordinate frame. Indeed, the second position is e.g. expressed in the coordinate frame linked to the ground (runway e.g.), while the first position is e.g. expressed in the terrestrial geographical coordinate frame WGS-84. Since approach and landing constraints e.g. are expressed with respect to the runway, the first position and the second position are preferentially brought to the runway coordinate frame.

In a second embodiment, the comparison phase 120 comprises the display, on a display of the locating device 24, of an image of the zone overflown determined from a set of images from a database according to the first position. The image is indeed chosen according to the first position so as to display the current zone overflown by the aircraft 12. The displayed image thus comprises the characteristic elements of the zone overflown by the aircraft 12. The database is stored e.g. in a memory of the calculator 29.

Such a display is e.g. an SVGS (Synthetic Vision Guidance Systems). The SVGS is an instrument approach procedure with vertical guiding which reduces the decision height to 150 feet from the standard height of 200 feet for a Category I approach. Such an approach is defined, in particular, in the standards RTCA DO-359, AC 20-167A and AC 20-185. In The SVGS, the location of the aircraft 12 is the basis of both the guiding system and of the synthetic visualization system.

The display phase further comprises the superimposition on the displayed image of a representation of the characteristic elements 16 of the zone overflown, the represented elements having been detected by the radar 32 during the determination of the second position. The representations of the characteristic elements 16 are e.g. symbols, such as crosses or circles. Said representations are intended to represent the characteristic elements 16 by the position thereof.

The first position is then validated when the representations of the characteristic elements 16 superimposed over the image have substantially the same position on the image as the corresponding characteristic elements 16 already present on the image. Otherwise, the first position is invalidated. It is in this way possible to gives the pilot more information and to reassures the pilot on the viability of the location.

Thereby, in the present embodiment, the data associated with the first position comprises the image determined in the database according to the first position. The data associated with the second position include representations of the characteristic elements 16 detected by the radar and from which the second position was obtained.

It should be noted that the first embodiment and the second embodiment of the comparison phase 120 are suitable for being combined.

Optionally, the locating method comprises a phase 130 of modifying the trajectory of the aircraft 12 when the first position is invalidated, e.g. when an alert is triggered. The modification phase 130 is implemented by the calculator 29. Optionally, said phase is implemented automatically (autopilot). In a variant, same is implemented by the pilot or by the crew.

Typically, the modification of the trajectory consists of the aircraft 12 climbing back in altitude when the conditions for a landing are not met, i.e. when an alert has been triggered.

Optionally, when the first position has been validated, the locating method comprises a phase 140 of merging the first and the second positions so as to obtain an optimized position. The accuracy of the location obtained is thereby increased.

In an example of implementation, the fusion phase 140 comprises the merging of the locations obtained during the first determination phase 100 and the second determination phase 110, by means of a Kalman filter.

Thereby, the present method makes it possible to consolidate a location made by a conventional locating method (inertial, radionavigation) via a radar location. In particular, when the safety objectives of air navigation cannot be achieved using conventional positioning methods (e.g. during approach and landing phases with no visibility), radar positioning is used to validate the conventional positioning.

Thereby, the method increases the level of integrity and/or continuity and/or accuracy of one or a plurality of conventional locating solutions. The location is thereby more reliable and safe.

The automatic guiding of an aircraft (autopilot) is based on the deviation of the position from the final approach segment. Lateral and vertical deviations are e.g. expressed in metric or angular form (standard DO-253). In approach and landing of category higher than I, the standard AC 120-118 requires an integrity of the locating solution of greater than $1\text{-}10^{-7}$ and an angular accuracy better than 0.2° vertically and better than 0.4° laterally. The present method makes it possible to achieve such levels of integrity by consolidating a conventional locating method with the radar method described.

The method is e.g. suitable for use during a descent phase of an aircraft below 200 feet and of landing on a runway with no visibility using a conventional ILS ("Instrument Landing System") category I locating solution and/or LPV (precision approach with satellite vertical navigation) enhanced by the radar locating solution described hereinabove.

During the approach and landing phase e.g., below a decision altitude or height, the crew or the pilot should have acquired the visual references needed for landing (approach lights, threshold and runway edge, wheel touchdown zone). The locating system 24 makes it possible to lower the decision threshold below the usual values since the values are determined by conventional locating solutions. Thereby, when the above is not possible, and an alert is triggered, the approach for landing is interrupted and the aircraft regains altitude.

The radar location implemented dispenses with an image database and can thus be used on all types of zones overflown, even when the zone is not referenced. The radar solution implemented is also simpler to take on-board an aircraft, unlike a solution based on a database occupying a large memory volume. Furthermore, the described method does not require any modifications or additions to be brought to the infrastructure of the landing site (airports).

A person skilled in the art would understand that the embodiments described hereinabove are likely to be combined with one another when such a combination is compatible.

One of the application examples e.g. relates to the landing of the aircraft on a runway. However, the present method also applies to other landing sites, such as heliports in the case of helicopters, or landings outside a conventional landing site. Similarly, the present method applies to other phases of flight, such as taxiing, take-off, cruising or further descent.

The invention claimed is:

1. Method for locating an aircraft in-flight, the aircraft overflying a zone of space comprising on the ground, the overflown zone being a landing site of the aircraft, characteristic elements arranged in at least one row, the characteristic elements being characteristic elements of the landing site, the method being implemented by a locating device borne by the aircraft, the locating device comprising a first locating unit and a second locating unit, the first locating unit comprising at least one sensor selected from an inertial sensor and a radio-navigation sensor, the second locating unit comprising a radar, the method comprising:
   a first phase of determining a position of the aircraft, called first position, by the first locating unit as a function of a signal supplied by the at least one sensor;
   simultaneously with the first phase of determining, a second phase of determining a position of the aircraft, called second position, by the second locating unit, the second phase of determining comprising:
      detecting, by the radar, the characteristic elements of the zone overflown, each detection of the characteristic elements being associated with coordinates;
      determining, according to the coordinates of the detected characteristic elements:
         distance of an orthogonal projection on a straight line passing through the at least one of the rows of elements of the horizontal projection of the radar, called the first distance, the horizontal projection of the radar being the orthogonal projection of the position of the radar on the ground; and
         distance of the orthogonal projection on a line perpendicular to the at least one of the rows of elements, called the second distance; and
      determining the second position according to the determined first and second distances; and
   a phase of comparing data associated with the first position and data associated with the second position after which the first position is either validated or invalidated,
wherein the landing site comprises a runway having a longitudinal axis equidistant from the longitudinal edges of the runway, called runway centerline, the characteristic elements being distributed over the runway in at least two longitudinal rows and at least one transverse row, the longitudinal rows being substantially parallel to the runway centerline, two of the longitudinal rows being each arranged along a distinct longitudinal edge of the runway, the at least one transverse row being substantially perpendicular to the runway centerline, the last one of the at least one transverse row along the direction of aircraft landing on the runway being called the runway threshold, the first distance being the distance from the orthogonal projection on the runway centerline of the horizontal projection of the radar, called axial offset, the second distance being the distance from the orthogonal projection on the straight line passing through the runway threshold of the horizontal projection of the radar, called the distance to the runway threshold.

2. The method according to claim 1, wherein said phase of comparing data comprises triggering an alert when the first position is invalidated, the method further comprising a phase of modifying the trajectory of the aircraft when an alert is triggered.

3. The method according to claim 1, wherein the first position is associated with a first standard deviation and the second position is associated with a second standard deviation, an uncertainty of the first position showing as a first ellipsoid, the center of which is the first position and a radius of which depends on the first standard deviation, an uncertainty of the second position showing as a second ellipsoid, the center of which is the second position and a radius of which depends on the second standard deviation, the first position being invalidated during said phase of comparing when the second ellipsoid and the first ellipsoid are disjoint.

4. The method according to claim 3, wherein when the first position has been validated, the method further comprises merging the first and second positions so as to obtain an optimized position of the aircraft.

5. The method according to claim 1, wherein said phase of comparing comprises:
   displaying, on a display of the locating device, an image of the zone overflown which is determined, according to the first position, from a set of images in a database, the displayed image comprising the characteristic elements of the zone overflown by the aircraft; and
   superposing over the displayed image a representation of the characteristic elements of the zone overflown which are detected by the radar during the determination of the second position, the first position being validated when the characteristic elements superimposed over the image have substantially the same position on the displayed image as the corresponding characteristic elements already present on the displayed image, and being invalidated otherwise.

6. The method according to claim 1, wherein said determining the second position comprises determining an angular offset between a radar axis and a line parallel or perpendicular to the at least one of the rows of elements, called the reference line, the first distance and the second distance being determined according to the determined angular offset.

7. The method according to claim 6, wherein said determining the angular offset comprises:

converting the coordinates of each detection of the characteristic elements into Cartesian coordinates;

for each value of angular offset comprised within a range of predetermined values, determining, for each detection of the characteristic elements, a Cartesian coordinate along the abscissa axis, corrected for the value of the angular offset; and for each angular offset value within the range of predetermined values, determining a number of detections corresponding to each Cartesian coordinate corrected along the abscissa axis, the angular offset value associated with the greatest number of detections being the angular offset between the radar axis and the reference line.

8. The method according to claim 6, wherein the reference line is a longitudinal axis equidistant from the longitudinal edges of the runway, called a runway centerline, during said determining the second position, and wherein each distance determination comprises:

calculating Cartesian coordinates of each detection of the characteristic elements, corrected for the angular offset, called optimal Cartesian coordinates;

determining a histogram of the positions along the x-axis of each detection of the characteristic elements as a function of optimal Cartesian coordinates of each detection of the characteristic elements, the histogram having at least two peaks; and determining an axial offset according to the Cartesian coordinates along the abscissa axis of at least the two peaks of the histogram.

9. The method according to claim 6, wherein the reference line is a longitudinal axis equidistant from the longitudinal edges of the runway, called a runway centerline, during said determining the second position, and wherein each distance determination comprises:

calculating Cartesian coordinates of each detection of the characteristic elements, corrected for the angular offset determined in the distance determination, called optimal Cartesian coordinates;

determining a histogram of the y-axis positions of each detection of the characteristic elements according to optimal Cartesian coordinates of each detection of the characteristic elements, the histogram having at least one peak; and determining a distance to a runway threshold according to the Cartesian coordinates along the y-axis of the peak (s) of the histogram.

10. An electronic device for locating an aircraft in-flight, the aircraft overflying a zone of space comprising on the ground, characteristic elements arranged in at least one row, the electronic locating device being borne by the aircraft, the electronic locating device implementing the method according to claim 1 using the first and second locating units.

11. An aircraft comprising a locating device according to claim 10.

12. The method according to claim 1, wherein the characteristic elements of the landing site comprise beacons.

* * * * *